Aug. 25, 1953 E. W. KAISER 2,649,769
JACKETED VALVE
Filed June 30, 1951
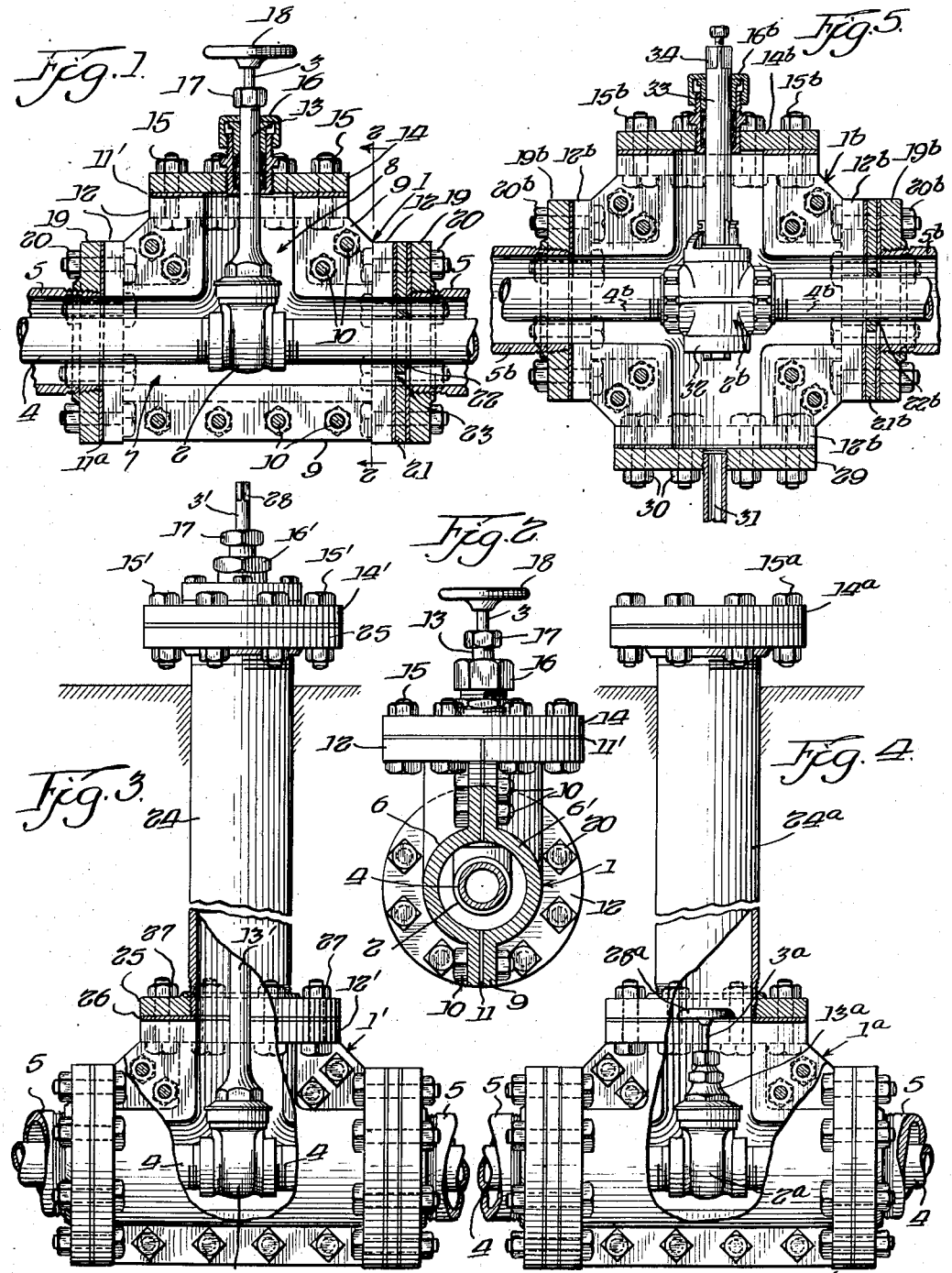
Inventor.
Edward W. Kaiser.
By W. F. Kellogg
Atty.

Patented Aug. 25, 1953

2,649,769

UNITED STATES PATENT OFFICE 2,649,769

JACKETED VALVE

Edward W. Kaiser, Chicago, Ill.

Application June 30, 1951, Serial No. 234,601

6 Claims. (Cl. 137—368)

1

This invention relates to improvements in valves and/or valve casing mountings and their operative inclusion in conduit systems, particularly, in conduit systems such as described and claimed in my pending applications for Letters Patent, Serial No. 511,366, filed November 22, 1943, now Patent No. 2,570,246, October 9, 1951, and Serial No. 47,851, filed September 4, 1948, said improvements being similar, and so, pertaining and related to the invention shown in my application for Letters Patent Serial No. 583,879, filed March 21, 1945, now abandoned.

It is an object of the invention to provide a valve for the inner pipe of a jacketed conduit line whereby to control and/or regulate the flow of matter therethrough, the same being so mounted as to provide an unimpeded or uninterrupted way about and by it and between the inner pipe and the conduit line jacket or casing, thus permitting multiple flow through the line— one, through the inner pipe, and another, through the flow-way between the inner pipe and the jacket, or, in other instances of installation and uses, allowing for the spacing and insulation of the inner pipe from the jacket or casing.

Another object of the invention is to provide a control valve and mounting for jacketed conduit lines, the valve being operable or regulatable at a point remote therefrom, as when an equipped line is subterranean or submarine installed and it becomes desirable or necessary that the above surface operation or regulation of said valve shall be effectable, or that said valve shall be operable at a point beyond the same.

Yet another object of the invention is to provide a valve installation of the indicated character which will eliminate the necessity and cost of constructing manholes or kindred or similar ways of ingress or egress to and from the same, as for adjustment, operation, regulation, repair or replacement.

The invention also aims to provide a jacketed valve installation of such construction that the same will in no manner impede or otherwise prevent a maximum flow of matter thereby through the line jacket or casing; also, will prevent leakage from the inner pipe and/or its jacket or casing.

Furthermore, it is an object of the invention to provide a jacketed valve in which the casing or jacket housing the same can be conveniently and quickly opened to permit working or like access to the valve, and which can be as conveniently and quickly closed, all with a minimum of disruption of the line maintenance and/or operation.

2

The foregoing, as well as other objects, advantages and meritorious teachings of my invention, will be in part obvious and in part pointed out in the following detailed disclosure thereof, when taken in conjunction with the accompanying drawings, it being understood that the forms of the invention presented herein are precise and what are now considered to be the better modes of embodying its principles, but that other modifications and changes may be made in specific embodiments without departing from its essential features.

In the drawings:

Figure 1 is a vertical longitudinal section through one form of my improved valve and/or valve casing mounting wherein the valve casing housing is shown to be of the T-type.

Figure 2 is a vertical transverse section taken on the line 2—2 of Figure 1, looking in the direction in which the arrows point.

Figure 3 is a side elevation, partly is section, of a modified form of valve and/or valve casing mounting, in which the T-type of valve casing housing is provided with an extended or elongated vertical jacket adapted to house the valve bonnet and operating stem in such a manner as to allow for its operation from a comparatively remote point.

Figure 4 is a view similar to Figure 3, illustrating a somewhat modified form of the invention, wherein an elongated sleeve or housing is extended from and beyond the valve casing and is adapted to house the valve stem and its operating handle therewithin, and Figure 5 is a vertical longitudinal section of another modified form of my improved valve and/or valve casing housing construction adapted to receive and support therein a rotary plug type of valve; a bottom cover being provided to the valve casing housing whereby to facilitate access to, and removal or replacement of the rotary valve plug core.

Referring in detail to the drawings, particularly to the Figures 1 and 2 thereof, the invention, generally comprises a sectional valve casing housing indicated in its entirety by the numeral 1, a valve casing 2 from which a valve connected operating stem 3 extends through an appropriate and hereinafter more fully described way in the housing, and inner pipes 4 received in and extending through casings or jackets 5 in radially and preferably equi-spaced relation to the walls thereof.

The valve casing housing 1 consists of a pair of complementally shaped and sized T-shaped sections 6 and 6', made of cast iron, steel or other material possessing sufficient compression and tensile stress resistant properties. The sections are each of cross-sectionally semi-circular shape. Hence, when arranged in assembled relation, they constitute a cross-sectionally circular housing of T-formation having ways 7 and 8 extending therethrough and opening onto the outer ends of its various branches (see Figure 1).

Like body reinforcing and connecting flanges 9 are integral with or fixedly mounted on the opposite longitudinal sides of the body sections 6 and 6'. Said flanges have complemental openings formed in the same adapted to receive connecting bolts 10 therethrough for an obvious purpose. If desired, packing 11 can be arranged between the flanges.

Correspondingly curved and/or complemental flanges 12 are integral with or otherwise fixed to the outer ends of each of the aforesaid branches of the T sections 6 and 6' and have suitably spaced openings therein, the purpose of which is hereinafter described. At this particular point, it will be noted especially on reference to Figures 2 of the drawings, that when the T-shaped sections 6 and 6' are in their assembled or juxtaposed relation, the aforesaid curved complemental flanges 12 are of circular disposition, permitting their use in connecting the flanges of housings or jackets 5 hereinafter described to the same.

The valve casing 2 housing a suitable valve (not shown), as for example, a gate, globe, or other conventional type of valve, is received in the housing 1 in the manner shown in Figures 1 and 2 in spaced relation to the interconnecting or communicating ways therein and therethrough. Preferably, the valve casing is disposed longitudinally of and in the lower way of the housing so that its opposed open ends communicate with those of said way.

A valve stem bonnet 13 is suitably connected to the upper side of the valve casing 2 and extends through and beyond the intermediate way 8 of the T housing 1.

Engaged over the upper or outer end of the intermediate way of the housing is a cover plate 14 having openings formed therein aligning with those in the adjacent flanges 12. Connecting bolts 15 are engaged through said openings for an obvious purpose.

Of course, a suitable gasket or packing 11' can be provided between the cover plate 14 and the adjacent flanges 12.

The cover plate 14 has a screw-threaded opening formed therein medially of itself whereby to receive and retain the shell casing of a suitable stuffing box 16. For manifest reasons, the upper portion of the valve bonnet 13 is engaged through and extended beyond said stuffing box and cover plate 14. Its outer and free end is equipped with suitable packing and a nut 17. Thus, said bonnet, and in consequence, the valve casing 2 will be effectually and firmly supported in the aforesaid spaced relation within the T housing 1. Also, leakage of gases, fluid, liquids, etc., through the cover plate will be prevented.

The hereinbefore identified valve stem 3 is rotatably received in and through the bonnet 13, having its lower end operatively connected to the valve (not shown) in the casing 2. A handle 18, or like means, is connected to the extended upper end of the stem for an obvious purpose.

The ports in the valve casing 2 opening into the housing way 7 have the adjacent ends of the inner pipes 4 engaged and/or secured therein. Hence, flow of matter through said pipes can be selectively controlled or modulated by operating the valve in the casing 2 through its stem 3.

To connect the opposite ends of the T housing 1 to adjacent ends of the casings or jackets 5, collars or circular flanges 19 with outside diameters substantially corresponding to those of the now circular flanges 12, are threadedly engaged or otherwise fixedly carried on said ends of the casings. The flanged casing ends are juxtapositioned with relation to said T housing flanges, suitably gasketed as at 11', and connected thereto by bolts 20 or other appropriate means.

In some installations of the T housing 1, anchor plates with diameters substantially corresponding to the outside diameters of said flanges 12 and 19, indicated at 21, may be employed. When used, an anchor plate is positioned between the flange 19 of one casing 5 and the adjacent flanges 12 of the T housing 1. It is then secured in fixed position by passing the aforesaid connecting bolts 20 therethrough, in the manner clearly shown in Figure 1 of the drawings.

Various forms of anchor plates may be and are used in connection with the invention. In the present embodiment, the anchor plate, as stated above, is of circular formation; it is preferably made of cast iron, steel, or other suitable material; it is formed with a centrally disposed opening therethrough for receiving an adjacent portion of one of the inner pipes 4 and is then welded or otherwise joined to said pipe, as indicated at 22. Also, suitable ports or ways 23 are formed in the plate and serve, with its installation as above described, to permit of the unimpeded flow of matter in and through the flowway provided and constantly maintained between the inner pipes 4, their casings or jackets 5 and the inner side walls of the ways provided in the T housing 1.

It will be understood and appreciated by workers skilled in this art that the usage of anchor plates, as above outlined, may be varied in the number or instances of their usage and in the relative spacing between the same within the casings or jackets 5 and the housings 1. The prime utility of these anchor plates, of course, is to prevent excessive relative longitudinal movement between the inner pipes 4 and their casings or jackets 5, yet sufficient movement to positively prevent excessive stressing of the same to such an extent as to bring about their fracturing or rupturing or other unwanted deterioration. But, in no instance of such anchor installation will that installation impede, impair, or otherwise interfere with a full and complete flowing of matter in the flowways between said inner pipes 4 and their casings or jackets 5 and through the T housings 1, all as above described.

In Figure 3, I have shown a modified form of my invention. It is especially advantageous for use in submarine, subterranean or in other installations where operation of the control valves in the valve casings 2 within the T housing 1 need be effected at a distance from or remote to the equipped conduit lines. Herein, the sectional T housing 1', receiving the valve casing 2' therein, has an extension intermediately of the same and the to-be-described cover plate 14'. Said extension consists of a tubular body or sleeve 24 of the desired or required length having its opposite ends flanged as at 25. One of the flanged ends is juxtapositioned with relation to the flanged end 12' of the housing 1', gasketed as at 26, and connected thereto by bolts 27. The remaining end of the extension 24 has the cover plate 14' engaged over and connected thereto by bolts 15'. This cover plate, in turn, is formed with a substantially centrally disposed opening which is fitted with a stuffing box 16'.

It is preferable that the extension 24 shall be constructed of cast iron, steel, or such other material as shall possess the necessary stress resistant and enduring properties.

An elongated valve stem bonnet 13' is received longitudinally through the extension 24 in spaced relation to the walls thereof. The lower end of said bonnet is connected to the upper side of the valve casing 2' while its upper end portion is engaged through the cover plate provided stuffing box 16' and equipped with a suitable packing nut 17'. A valve stem 3', connected at its lower end to the valve (not shown) in the valve casing 2' is rotatably received in and through the elongated bonnet 13' and has its upper end extended therebeyond where it is squared, as at 28, or otherwise prepared to mount a handle or other rotation facilitating device, not shown.

Thus, operation of the valve within its casing 2' by means of the valve stem 3' rotatable in and extended from the upper end of the elongated bonnet 13' from a point removed or remote from said valve will be permitted. Moreover, since the valve stem is extended beyond the tubular body or sleeve 24 and its cover plate 14', the flowway between the inner pipes 4 and the casings 5, and the valve bonnet 13' and the walls of the tubular body will be maintained closed against leakage or other outflow of matter from or beyond the same.

A further modification of the above described tubular body or sleeve construction may be, and under some conditions of usage, etc., will be preferable, such for example, as that form of the invention shown in Figure 4 of the accompanying drawings. Herein, the tubular body 24ª, of desired or required length, is connected to and communicates with the sectional housing 1ª and has its upper and open end fully closed by a cover plate 14ª engaged thereover and secured by bolts 15ª. The valve (not shown) received in the valve casing 2ª has a stem 3ª connected to and extended therefrom through a suitably packed bonnet 13ª mounting an operating handle 28ª upon its upper and free end for an obvious purpose.

The length of the valve stem 3ª is less than that of the stem 3', and its handle 28ª is housed in the tubular body 24ª or at least is accessible therefrom. Direct access to the handle 28ª for operating the valve stem 3ª and the valve connected thereto is effected by removing the cover plate 14ª from the upper end of the tubular body 24ª.

In Figure 5 of the drawings, I have shown yet another modified form of the invention. Herein, I have shown a cross-type of housing 1ᵇ consisting of complemental cross-sectionally semi-circular longitudinally joined sections having crossed ways in and through the same opening onto their opposed ends. Said opposed ends are flanged, as at 12ᵇ, so that with assembly and connection of the housing section in the manner shown in said Figure 5, the flanges will be of circular form. Certain of these flanged opposed ends 12ᵇ have the flanged ends 19ᵇ of casings or jackets 5ᵇ connected thereto by bolts 20ᵇ, welding, or other means.

One of the remaining opposed flanged open ends of the housing has a cover or closure plate 29 engaged thereover and secured thereto by bolts 30, or like means; said plate preferably having a drain 31 connected to and communicating with the housing interior for an obvious purpose. The other thereof has a cover plate 14ᵇ engaged thereover and connected thereto by bolts 15ᵇ. This plate 14ᵇ is formed with a substantially central opening fitted with a suitable stuffing box 16ᵇ.

A valve casing 2ᵇ adapted to and receiving a conventional form of plug or core valve is arranged within the cross-housing 1ᵇ, as is clearly shown in said Figure 5, having a removable bottom or plate 32, to permit removal of said valve (not shown) for inspection, repair, replacement, etc., via the adjacent open end of said housing normally covered by the plate 29. A valve operating stem 33 is connected to and extends upwardly or vertically from the valve housed in the valve casing 2ᵇ through the stuffing box 16ᵇ, aforesaid, to a point above and beyond the same. If desired, the extended outer or upper end of this stem 33 may be squared or otherwise treated, as indicated at 34, to permit the connection and securing of a suitable type of operating handle (not shown) thereto.

Because of the engagement of the stem 33 through the stuffing box 16ᵇ, it will be understood and appreciated that the valve casing 2ᵇ will be accorded a partial support for retaining it in that intermediate position within the cross-housing 1ᵇ shown in the drawing Figure 5.

Inner pipes 4ᵇ are connected to and communicate with the opposed ports of the plug valve casing 2ᵇ. These pipes are disposed longitudinally of and through the horizontal opposed ways of the cross-housing 1ᵇ into and through the casings 5ᵇ.

An anchor plate 21ᵇ may be and preferably is interposed between and flanged end 19ᵇ of one of the casings 5ᵇ and the adjacent flanged end 12ᵇ of said cross-housing. Said anchor is immovably secured in the stated position by means of the hereinbefore described bolts 20ᵇ which pass therethrough, while the adjacent inner pipe 4ᵇ rather snugly engages through a central opening in the plate. Thus, an additional supporting means is provided the inner pipe and/or pipes 4ᵇ, retaining them in the radially spaced relation to the casings 5ᵇ and the walls of the horizontal ways of the housing 1ᵇ, ensuring a continuous uninterrupted or unimpeded flowway, such as hereinbefore explained. Also, the anchor plate is welded to adjacent portions of the particular inner pipe 4ᵇ passed therethrough, as indicated at 22ᵇ.

The anchor plates 21 and 21ᵇ employed in the heretofore described embodiments of my invention may, in some instances, be dispensed with, more especially, their usage may be dispensed with when the distance between the conduit line installed valve casing housings or jackets is such that support of the inner pipes of said line in each of said housings or jackets is unneeded, i.e., the number of anchor plate installations may be accordingly reduced. It is important, however, that the inner pipes of the conduit line and the housing or jacket installed valve casings of the inner pipes of said line shall be supported in the hereinbefore described radially spaced relation to the inner side walls of the conduit line casings or jackets and housings whereby to ensure the also heretofore described continuous and unimpeded flowway therebetween. To such end, I wish to point out that the engagement of the valve stems and valve stem bonnets through the stuffing boxes of the valve casing housing or jacket cover plates 14, 14', and 14ᵇ is such that their respective valve casings 2, 2' and 2ᵇ will be most effectually retained in said spaced relationing support; moreover, that the secureness of such support is materially improved upon by the installation of the aforesaid anchor plates 21 and 21ᵇ in the valve casing housing or jackets 1, 1', 1ᵃ and 1ᵇ. That is to say, the said valve casings are afforded dual supporting means and so, their retention in the spaced flowway ensuring position or relationship is substantially ensured.

While I have hereinbefore described my invention adapted to a T-housing and a cross-housing, also to different forms of valve stems and operating handle housings or jackets, it is to be understood that the same may be embraced in/or by further types and modified forms of housings and/or couplings and valve stem jacketing means. The essence of the herein disclosed and later claimed invention resides in the main, in (1) housing or jacketing an inner pipe flow control or regulating valve, regardless of the type thereof, in a housing or jacket of such construction as will permit its installation, inspection or repairing in a conduit line with a minimum of disruption to that line, its construction, its bedding or laying and its operation; (2) in permitting access to be had to the interior of the valve casing housing with a minimum of effort and a mimimum of time and with the least possible interruption of the line operation; (3) in so arranging and supporting the valve casing and its valve in the housing or jacket as to space and positively retain the same spaced from the walls thereof, thus ensuring the forming and maintenance of a clear and unimpeded flowway thereby, i. e., a flowway between the outer sides of the valve casing and adjacent connected portions of the inner pipes of the conduit line, and the inner sides of the valve casing housing or jacket and adjacent connected portions of the casings of said conduit line; (4) in permitting the control or regulating operation of the valve casing retained valve in the inner pipes of the conduit line without interfering with the continuing flow or passage of matters through the aforesaid flowway; (5) in permitting the valve control or regulation, as above, at points remote to or beyond its point of installation, or in other instances, in proximity thereto, and (6) in the novel construction and operational disposition of the pipe anchors in said conduit line whereby they serve to anchor the inner pipe and casing lines against excessive and possibly damaging relative longitudinal movement, as by their expansion and/or contraction, and at the same time, provide the inner pipe or pipes with sure and enduring support ensuring their permanent spacing from the housings or jackets receiving them and hence, permanent flowways therebetween.

I claim:

1. A jacketed valve comprising a valve casing housing having outwardly opening and intercommunicating ways therein, one of said ways being angularly disposed with relation to the others, a valve casing in the housing ways spaced from the side walls thereof, a cover plate having an opening therein engaged with the housing over the open outer end of said angularly disposed way, a stuffing box on the cover cooperatively associated with the cover opening, and a valve stem bonnet connected at one end to said valve casing and extended therefrom into said angularly disposed way and through and beyond the opening in the cover plate and stuffing box and fixedly and supportingly engaged by said stuffing box.

2. A jacketed valve, comprising a vertically divided sectional valve casing housing, means detachably connecting the sections of said housing, said housing having outwardly opening and intercommunicating ways in and through the same, one of said ways being angularly disposed with relation to the others, a valve casing in the housing ways spaced from the side walls thereof, a cover plate having an opening therein connected with the housing over the open outer end of said angularly disposed way, a stuffing box on the cover cooperatively associated with the cover opening, and a valve stem bonnet connected at one end to said valve casing and extended therefrom into said angularly disposed way and through and beyond the opening in the cover plate and the stuffing box and fixedly and supportingly engaged by said stuffing box.

3. A jacketed valve, comprising a valve casing housing having outwardly opening and intercommunicating ways in and through the same, one of said ways being angularly disposed with relation to the other thereof, a valve casing in the housing ways in proximity to their points of intercommunication and spaced from the side walls of the same, a valve stem bonnet connected at one end to the valve casing and extended from the same into, through and beyond the angularly disposed way in spaced relation to its side walls, having the valve stem extended longitudinally through and beyond its outer end, cover means engaged with the housing over the open outer end of said angularly disposed way having the bonnet extended therethrough, and means on the cover means supportingly engaging the bonnet and retaining it against lateral movement and in said spaced relation to the side walls of the angularly disposed way.

4. A jacketed valve, comprising a valve casing housing having outwardly opening and intercommunicating ways in and through the same, one of said ways being angularly disposed with relation to the other thereof, a valve casing in the housing ways at their points of intercommunication and spaced from the side walls of the same, a valve stem bonnet connected at one end to the valve casing and extended from the same into, through and beyond the angularly disposed way in spaced relation to its side walls having the valve stem extended longitudinally through and beyond its outer end, a cover plate arranged over the open outer end of said angularly disposed way connected to an adjacent portion of the housing having the bonnet extended therethrough, and means on the cover plate sealingly receiving said bonnet therethrough and supporting the same and retaining it against lateral movement and in said spaced relation to the side walls of the angularly disposed way.

5. A jacketed valve comprising in combination, a valve casing housing having outwardly opening intercommunicating ways in and through the same, one of said ways being angularly disposed with relation to and extended from an intermediate portion of the other thereof, a valve casing in the housing ways at their points of intercommunication and spaced from the side walls of the same, pipes connected to the inlet and outlet ports of the valve casing extending through said other way of the housing in spaced relation to its side walls, cover means over the open outer end of said angularly disposed way connected to an adjacent portion of said housing, a valve stem bonnet connected at one end to the valve casing extended from the same into, through and beyond the angularly disposed way in spaced relation to its side walls and through said cover means having the valve stem extended longitudinally through and beyond its outer end, means on the cover means sealingly and supportingly engaging the bonnet, retaining the same against lateral movement and in said spaced relation to the side walls of the angularly disposed way, and a ported anchor plate in said other way fixedly connected to a portion of the housing receiving one of said pipes therethrough and connected to the same, supporting the pipes and the casing in said spaced relation to the side walls of the other housing way and against movement longitudinally thereof.

6. A jacketed valve, comprising a housing having relatively angularly disposed outwardly opening intersecting ways in and through the same, a plug valve casing in the housing ways at the points of their intersection spaced from the side walls of the same having the opposite ends of its valve seat aligned with one of said intersecting ways, a valve stem bonnet connected to the casing adjacent one of the valve seat ends and extended therefrom into, through and beyond the adjacent portion of the valve seat aligned way, a cover means over the outer end of said adjacent portion of the valve seat aligned way removably connected to an adjacent portion of said housing and having the bonnet extended therethrough, means on the cover means sealing the passage of the bonnet therethrough and supporting said bonnet and valve casing from the cover means, and other cover means over the open opposite end of said valve seat aligned way removably connected to an adjacent portion of the housing.

EDWARD W. KAISER.

References Cited in the file of this patent

UNITED STATES PATENTS

| Number | Name | Date |
| --- | --- | --- |
| 316,967 | Heber | May 5, 1885 |
| 319,765 | Westinghouse | June 9, 1885 |
| 1,946,207 | Haire | Feb. 6, 1934 |